Patented Apr. 1, 1941

2,236,529

UNITED STATES PATENT OFFICE 2,236,529

DERIVATIVES OF ALCOHOL AMINES

Albert K. Epstein and Morris Katzman, Chicago, Ill., assignors to The Emulsol Corporation, Chicago, Ill., a corporation of Illinois No Drawing. Application July 22, 1939, Serial No. 285,956

20 Claims. (Cl. 260—401)

Our invention relates to a new class of chemical substances, and more in particular to a new class of chemical substances having capillary active properties and particularly adapted for use as detergents, wetting, penetrating, emulsifying, lathering, flotation and anti-spattering agents, and for frothing purposes.

The principal object of the present invention is the provision of a new class of chemical substances capable of satisfactory use in connection with the problems and fields hereinabove and hereinafter discussed.

Another object is the provision of a new class of chemical substances which are in general of relatively simple structure and can be cheaply made in commercial quantities.

Another object is the provision of a new class of chemical substances having improved wetting and detergent characteristics.

Other objects and features of the invention will be apparent from a consideration of the following detailed description.

The substances of the invention are, in general, derivatives of alcohol amines or hydroxy amines wherein at least one hydroxyl hydrogen is replaced by a carboxylic acid acyl radical of a sulpho-poly-carboxylic acid, and wherein at least one amine hydrogen or hydroxyl hydrogen of the hydroxy amine is replaced by a carboxylic acid acyl radical having at least four but preferably from eight to eighteen carbon atoms. In all cases the compounds contain at least one unesterified sulphonic acid group although, in certain circumstances, there may be more than one unesterified sulphonic acid group in the polycarboxylic acid radical or there may be sulphonic acid groups that are esterified and other sulphonic acid groups that are not esterified. The poly-carboxylic acid radical with the unesterified sulphonic acid group is preferably of lower molecular weight and, for best results, should be aliphatic in character and should contain not more than eight carbons.

Considering the compounds from another aspect, the molecule in each instance contains preferably a relatively high molecular weight lipophile group and a hydrophile sulphonic acid group or groups or free or unesterified OH groups in conjunction with a sulphonic acid radical or radicals. A more complete understanding of what may comprise the lipophile group and the particular character of the sulpho-poly-carboxylic acid groups will be had as the detailed description progresses.

More specifically, most of the substances of the invention are alkylol amines in which hydroxy hydrogen is replaced by the acyl radical of a lower molecular weight aliphatic sulphodicarboxylic acid, and wherein hydrogen of at least one of the hydroxy groups of the alcohol amine is replaced by an acyl or alkyl radical containing at least four carbon atoms and preferably between eight and eighteen carbon atoms.

Illustrative examples of compounds having the probable formulae and falling within the scope of the invention are as follows:

(1)

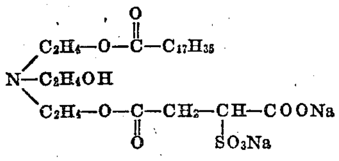

(2)

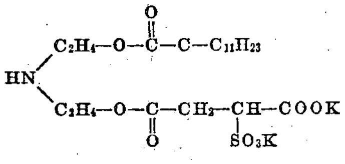

(3)

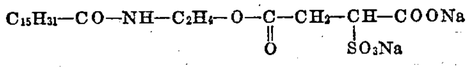

(4)

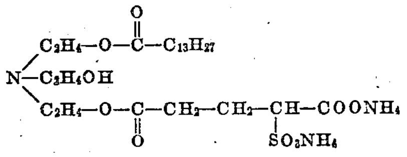

(5)

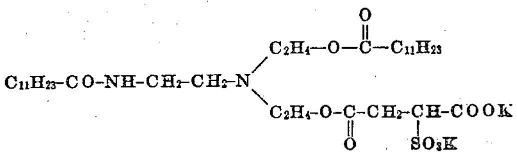

(6)

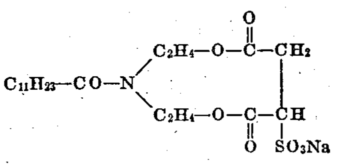

(7)

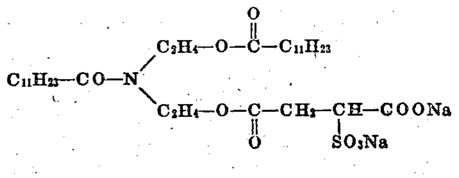

(8)
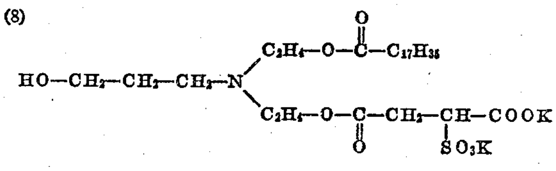
(19)
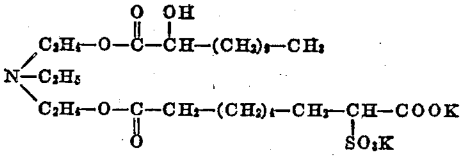
(9)
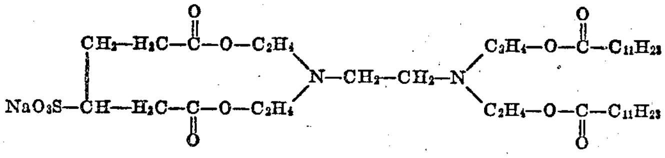
(10)
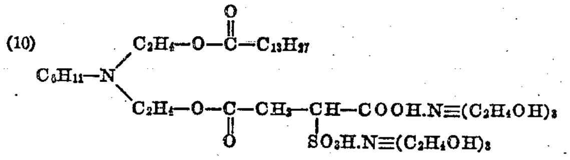
(20)
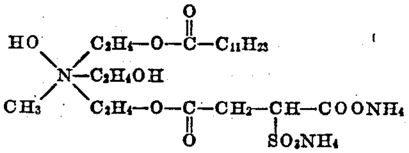
(11)
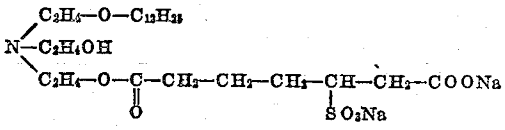
(21)
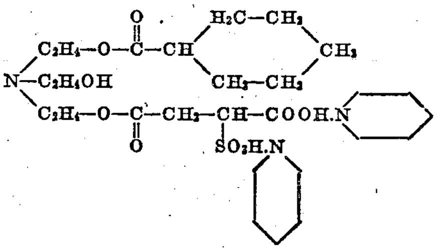
(12)
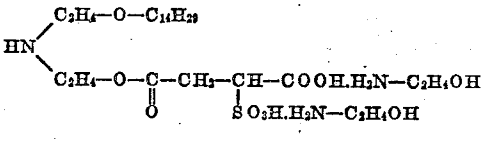
(22)
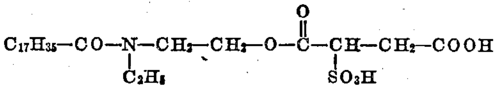
(13)
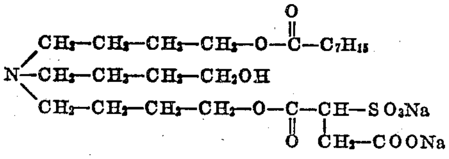
(23)
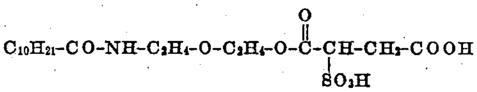
(14)
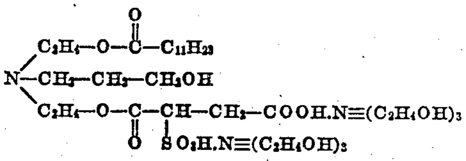
(24)
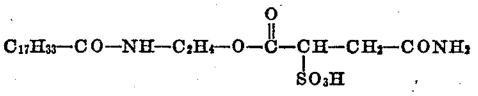
(25)
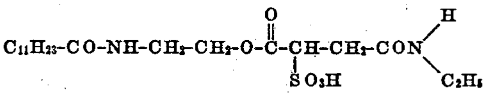
(15)
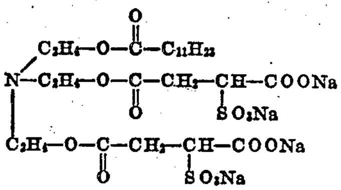
(26)
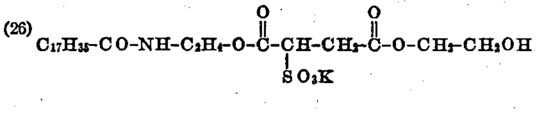
(16)
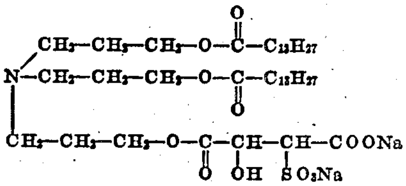
(27)
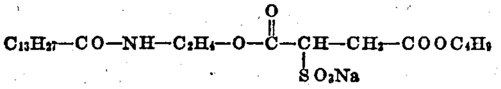
(28)
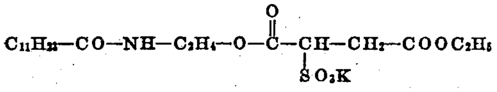
(29)
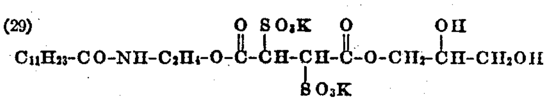
(17)
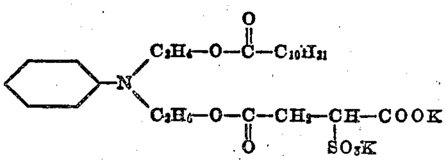
(30)
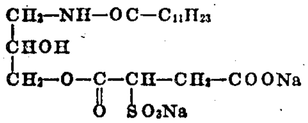
(18)
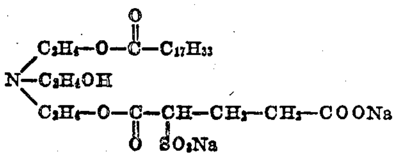
(31)
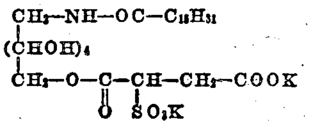

(32) 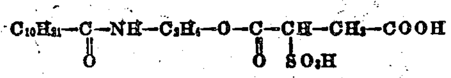

(33) 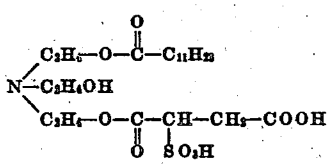

(34) 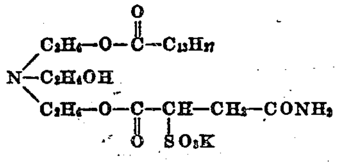

(35) 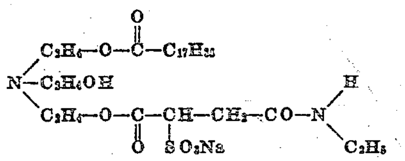

(36) 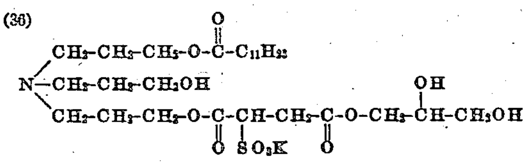

(37) 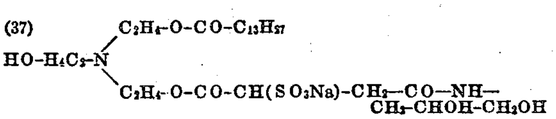

While the above examples represent single substances, it will be understood that, in practice, it is, in general, more advantageous to employ mixtures of any two or more thereof with or without diluents.

Many different types of compounds may be selected as lipophile groups which are to be reacted with the alcohol amines, principally compounds having lipophile radicals of relatively high molecular weight. For example, the following materials may be utilized as sources of lipophile groups: Straight chain and branched chain carboxylic, aliphatic, and fatty acids, saturated and unsaturated, such as butyric acid, capyrylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oil, whale oil, shark oil, partially or completely hydrogenated animal and vegetable oils such as those mentioned; oxidized and/or polymerized higher fatty acids or higher fatty acids derived from oxidized and/or polymerized triglyceride oils; hydroxy and alpha-hydroxy higher aliphatic and fatty acids such as i-hydroxy stearic acid, dihydroxy stearic acid, alpha-hydroxy stearic acid, alpha-hydroxy palmitic acid, alpha-hydroxy lauric acid, alpha-hydroxy coconut oil mixed fatty acids, and the like; other substituted fatty acids such as

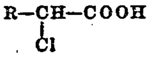

where R is a higher molecular weight hydrocarbon radical; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid, and abietic acid; aromatic acids such as phthalic acid, benzoic acid, naphthoic acid, pyridine carboxylic acids, hydroxy aromatic acids such as salicylic acid, hydroxy benzoic and naphthoic acids, and the like; and substitution and addition derivatives such as amino, halogen, hydroxy, sulphate, sulphonic, phosphate and the like substitution and addition derivatives of the aforementioned carboxylic substances. It will be understood that mixtures of any two or more of said acids may be employed.

The alcohol amines which provide the linkage between the lipophile group and the sulpho-polycarboxylic group may be selected from a large class and include primary, secondary and tertiary alcohol amines and alkylolamines, symmetrical, unsymmetrical, normal and iso-derivatives, such as monoethanolamine, diethanolamine, triethanolamine and mixtures thereof such as occur in the so-called commercial triethanolamine, propanolamine, dipropanolamine, butanolamine, iso-butanolamine, pentanolamine, di-pentanolamine, hexanolamine, dihexanolamine, decylolamine, laurylolamine, hexadecylolamine, octodecylolamine, cyclohexyl ethanolamine, N-cyclohexyl butanolamine, ethanolaniline, mono-ethyl-ethanolamine, triethanol methyl ammonium hydroxide, diethanol-butanolamine, diethanolamine cyclo-hexylamine, mono-butyl ethanolamine, diethanol methyl amine, alkylolamines including mono- and poly-amines of other monovalent or polyvalent alcohols such as glycols, glycerol, sugars, and sugar alcohols such as dextrose, sucrose, sorbitol, mannitol and dulcitol; alkylol polyamines such as mono- and poly-hydroxy derivatives of ethylene diamine, diethylene triamine and triethylene tetra-amine, arylolamines such as N-phenyl ethanolamine, cyclic hydroxy amines including, for example, p-amino phenol,

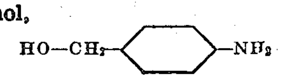

and the like. The alcohol or alkylol radicals of the alcohol amines or alkylolamines may contain substituent groups such as amino, nitrile, carboxyl, hydroxy, halogen, sulphate, sulphonic, phosphate, and the like and the sequence of carbon atoms therein may be interrupted by O, S, C=O, NH, NR where R is alkyl, and the like.

From a study of the compounds which are listed hereinabove, those skilled in the art will understand that many different expedients may be employed for forming the compounds in so far as the dominant lipophile group and the sulpho-dicarboxylic acid group are concerned.

In the case particularly of aliphatic sulphonic acids, a reactive halogen may be caused to react with an alkali sulphite such as sodium sulphite, potassium sulphite, ammonium sulphite or lithium sulphite or some other sulphite in aqueous solution, if desired.

Another method is to introduce a sulph-hydryl or disulphide or some other suitable sulphur group and then oxidize to the sulphonic acid with nitric acid or a permanganate or some other oxidizing agent.

Another method comprises reacting a lipophile derivative of an alcohol amine, containing at least one free or esterifiable hydroxy group, with a halogeno-poly-carboxylic acid such as monochlorsuccinic acid or dichlorsuccinic acid, or with a halogeno-poly-carboxylic acid halide such as monochlorsuccinyl chloride or dichlorsuccinyl bromide and then converting the latter into the sulphonic acid derivative by reaction with an alkali sulphite. Other halogeno-poly-carboxylic acids or derivatives thereof which may be utilized are those derived from mono- and di-brom glutaric acid and the corresponding glutaryl bromides, and the corresponding halogen derivatives of adipic acid, sebacic acid and the like.

Still another method comprises reacting a sulpho-poly-carboxylic acid with a higher fatty acid mono-ester of triethanolamine or the like.

A still further method which may be employed with particular advantage in certain cases is initially to provide an intermediate product, for example, triethanolamine in which one hydroxy hydrogen is replaced by the carboxylic acyl radical of a sulpho-poly-carboxylic acid, and then react the same with a higher molecular weight acyl halide or a lower molecular weight, say, ethyl, ester of a higher aliphatic acid or the like to replace hydroxyl hydrogen with a higher molecular weight carboxylic acyl group.

Other alternative methods for making some of the compounds and which offer certain advantages in some instances comprise (1) reacting an amide of a higher fatty acid or the like, such as lauric acid amide, with a halogen hydrin, such as ethylene bromhydrin or glycerol chlorhydrin, whereby halogen hydride is split out, and then reacting the resulting compound with maleic anhydride or the like followed by treatment with a salt of sulphurous acid such as sodium or potassium bisulphite; (2) reacting a halogen hydrin, such as ethylene bromhydrin, with maleic anhydride or the like to form the halogen-containing ester, introducing the sulphonic group with an alkali sulphite or bisulphite or the like, and then reacting with a higher fatty acid amide to split out hydrobromic acid; (3) reacting a higher fatty acid amide with an alkylene oxide, such as ethylene oxide to form one or a plurality of oxy-ethylene chains, and then reacting the resulting compound with maleic anhydride or the like followed by treatment with an alkali sulphite or bisulphite.

A still further method comprises reacting a lipophile derivative of an alcohol amine, containing at least one free or esterifiable hydroxy group, with an unsaturated poly-carboxylic acid such as maleic acid, and more particularly an anhydride of such an acid, such as maleic anhydride and then introducing a sulphonic group by reaction with salts of sulphurous acids such as sulphites and bisulphites, the reaction being conducted at such pH ranges as to obtain the desired speed of reaction. In general, alkali sulphites and bisulphites such as sodium or potassium sulphites and bisulphites are satisfactory. Alternatively, after the reaction with the maleic anhydride or the like, halogen may be introduced at the double bond either directly or, for example, by means of hypochlorous acid, and the resulting compound treated with an alkali sulphite such as sodium, potassium, ammonium, or lithium sulphite.

Instead of initially producing the lipophile derivative of the alcohol amine and then introducing the sulpho-poly-carboxylic acid radical, the lipophile radical may be introduced subsequent to the introduction of the sulpho-poly-carboxylic acid radical by reaction preferably with a higher fatty acid halide or other lipophile radical. Thus, for example, an alcohol amine such as triethanolamine may be treated with maleic anhydride in such proportions as to react with one or more hydroxy groups, however, leaving free at least one hydroxy group. The resulting halogen-containing compound may then be reacted with the required amount of alkali bisulphite or the like in aqueous media to introduce a sulphonic group. The resulting compound may then be isolated and purified or reacted in the impure state, but in dry form, with an equivalent amount of a long chain or higher molecular weight carboxylic acyl halide to replace the hydrogen of the remaining free hydroxy group with an acyl radical.

The following examples are illustrative of the preparation of compounds falling within the scope of the invention. It will be understood, of course, that said examples are given only by way of illustration and are not to be considered in any way limitative of the true scope of the invention. Thus, for example, other methods may be employed, the proportions of reacting ingredients and times and temperatures of reaction may be varied, and supplementary processes of purification may be resorted to wherever found desirable or convenient. These and other variations and modifications will be evident to those skilled in the art in the light of the guiding principles disclosed herein.

*Example A*

5.2 grams of the mono-caprylic acid ester of triethanolamine and 2.1 grams of maleic anhydride were heated to 90 degrees C. for five minutes, with stirring. To the resulting product 14 cc. of water and 5.1 grams of sodium sulphite were added and the mixture was maintained at about 65 degrees C. for about five minutes with stirring or until it became jelly-like. The reaction product had good foaming and surface tension reducing properties and contained a substantial proportion of a compound having the following probable formula:

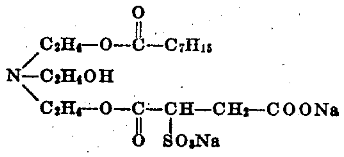

*Example B*

(1) 25 grams of diethanolamine were dissolved in 25 cc. of water and then 23 grams of lauroyl chloride were added dropwise, with stirring, the mass being cooled so that the temperature did not rise above about 30 degrees C. To the resulting reaction product, 1000 cc. of water were added and the mass was heated to 80 degrees C., common salt being added to the point of saturation. An oily layer formed on the top of the reaction mixture and was removed and then dissolved in ether. Anhydrous sodium sulphate was then added to the ether solution, the mass was filtered, and the ether evaporated. The residue contained predominantly the lauric acid amide of diethanolamine.

(2) 9.9 grams of lauric acid amide of diethanolamine, obtained as described in part (1) hereinabove, and 3.6 grams of maleic anhydride were heated to 80 degrees C., with stirring, after which the temperature spontaneously rose to 90 degrees C. The reaction mixture was then heated to 100 degrees C. and kept at such temperature for between 5 and 10 minutes.

(3) 12 grams of the reaction product from part (2) hereinabove, 20 cc. of water and 10 grams of sodium bisulphite were heated at a temperature of 55 degrees C.–60 degrees C. for about 10 minutes, with stirring, the resulting reaction product had good foaming and wetting properties.

(4) In order to eliminate the excess sulphite present in the reaction product, 6 grams of a 30% hydrogen peroxide solution were added dropwise, with stirring, the mass being maintained in an ice bath in order to prevent the temperature rising above about 35 degrees C. The reaction product was then neutralized with 8 cc. of a 20% solution of sodium hydroxide. The final product, which had good foaming and wetting properties, contained a substantial proportion of a compound or a mixture of compounds having the following probable formulae:

(a) 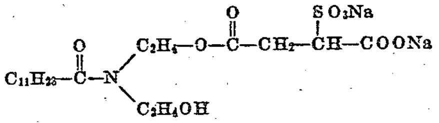

(b) 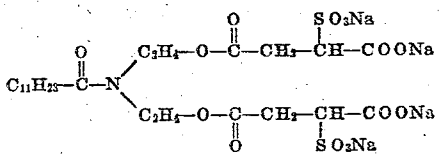

*Example C*

11 grams of the mono-octyl ether of triethanolamine and 5.5 grams of maleic anhydride were heated for 5 minutes at 110 degrees C. with constant stirring. The resulting reaction product was cooled to about room temperature and 10 grams thereof, 10 grams of sodium bisulphite, and 20 cc. of water were mixed together and heated, with stirring, for about 10 minutes at 60 degrees C.–70 degrees C. The reaction product, which possessed foaming and wetting properties, contained a substantial proportion of a compound having the following probable formula:

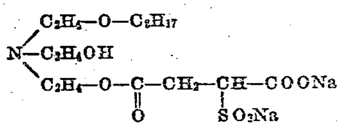

*Example D*

(1) 10 pounds of a monoglyceride made from partially hydrogenated cottonseed oil and 8.1 pounds of triethanolamine were heated for one hour, in the presence of steam and vacuum, at a temperature beginning with 100 degrees C. and ending with 167 degrees C. The resulting product was then washed twice with hot water until the same was substantially free of glycerin and excess triethanolamine. The product was then dried. It comprised essentially mono esters of triethanolamine with the higher fatty acids present in the partially hydrogenated cottonseed oil.

(2) 20 grams of the reaction product produced in part (1) hereof and 10 grams of sulpho-maleic anhydride were mixed together, the temperature spontaneously rising to 95 degrees C. at which temperature the mass was maintained for about 10 minutes, with stirring. It was then dissolved in 100 cc. of isopropyl alcohol and neutralized with 250 cc. of ½ normal alcoholic KOH. The precipitate which formed was filtered off and dried. It was a cream colored powder, soluble in water and foamed in both dilute alkali and acid. The reaction product comprised primarily a compound having the following probable formula:

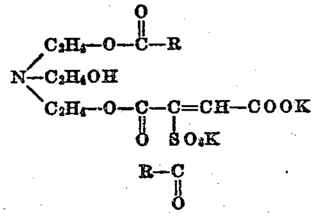

is acyl radical of fatty acids of hydrogenated cottonseed oil.

*Example E*

(1) 19.1 grams of tri-iso-propanolamine were dissolved in 50 cc. of chloroform and there were added thereto, slowly and with stirring, over a period of about 15 minutes, 22 grams of lauroyl chloride. The temperature spontaneously rose to 70 degrees C. The mass was then cooled to room temperature, 100 cc. of ethyl ether were added thereto and it was then filtered. The ether-chloroform solution was then evaporated from the filtrate on a hot water bath in vacuo. The residue was a viscous liquid.

(2) To the product obtained as described in part (1) hereof there were added 11 grams of maleic anhydride and the resulting mixture was heated at 100 degrees C., with stirring, for about 10 minutes.

(3) 10 grams of the reaction product produced in part (2) hereof, 10 grams of sodium bisulphite, and 25 cc. of water were heated to 50 degrees C., with stirring, and maintained at that temperature for about 10 minutes. The reaction product, which had good foaming properties, contained a substantial proportion of a compound having the following probable formula:

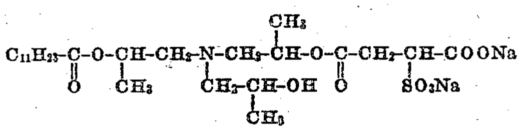

*Example F*

(1) 600 grams of triethanolamine and 864 grams of caprylic acid were heated for about one hour at a temperature between 170 degrees C. and 250 degrees C., the free fatty acid content at the end of the heating period being less than 0.5%. The reaction product contained a mixture primarily of mono- and di-caprylic acid esters of triethanolamine.

(2) 17.5 grams of the reaction product produced in part (1) hereof and 10 grams of sulphomaleic anhydride were mixed together at 25 degrees C., the temperature spontaneously rising to 110 degrees C., at which temperature the mass was maintained, with stirring, for a period of about 5 minutes. It was then cooled down to 90 degrees C. and dissolved in 100 cc. of isopropyl alcohol. The resulting solution was cooled to 25 degrees C. and there were added thereto, slowly and with stirring, 200 cc. of ½ normal alcoholic KOH. The alcoholic solution was then decanted from the precipitate and the latter was dried. It was a powdery material, slightly hygroscopic, and had foaming properties. It comprised primarily a mixture of compounds having the following probable formulae:

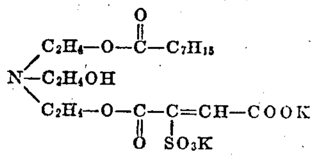

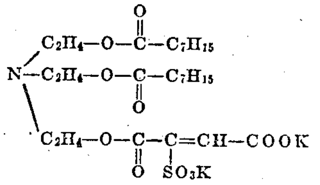

(3) 5 grams of the reaction product produced in part (2) hereof, 6 grams of potassium meta bisulphite, and 10 cc. of water were heated at 60 degrees C. to 70 degrees C. for 10 minutes, with stirring. The reaction product was water-soluble, had good foaming properties, and contained a substantial proportion of a mixture of compounds having the following probable formulae:

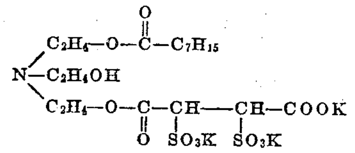

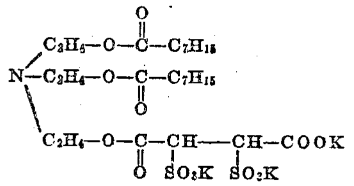

(4) 5 grams of the reaction product produced in part (2) hereof, 27 grams of a commercial solution of sodium hypochlorite (containing approximately 5.5% NaOCl), 2 cc. of glacial acetic acid and 50 cc. of water were mixed together and maintained for two hours in an ice bath, with constant stirring. The resulting product, which had good foaming properties, contained a substantial proportion of a mixture of compounds having the following probable formulae:

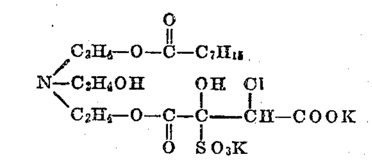

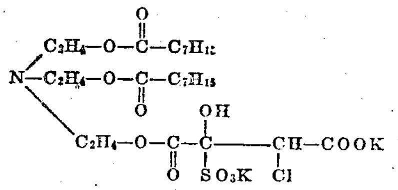

In certain instances, as indicated, by way of illustration, in Examples 22, 23, 32 and 33, a free carboxyl group may be present in the compounds. Such compounds may be further reacted to esterify or amidify the free carboxyl group to convert the same into the groups $—CONH_2$, —CONHR, and COOR where R is preferably lower molecular weight alkyl or cycloalkyl such as ethyl, butyl, cyclohexyl and the like, which may contain substituent groups such as halogen, hydroxy, amino, cyanogen and the like. In the case of the ester linkage, that is, the —COOR group, the radical R may be that of a polyhydric alcohol or polyhydroxy substance such as glycerol, glycols and polyglycols such as ethylene glycol, propylene glycol, butylene glycol, diethylene glycol, polyglycerols, and the like. Such derivatives have particularly desirable properties in the technical and industrial arts. The usual amidification and esterification procedures can readily be adapted by the skilled chemist to the preparation of such derivatives.

Those substances which are freely soluble in water may be recovered from their solutions in the customary manner by concentration and crystallization. As stated hereinabove, as the mass of the lipophile radical increases, solubility decreases and affinity for water is manifested by the dispersibility in water. From these dispersions, the substances may be readily recovered by "salting out" with suitable soluble electrolytes. Common salt is very satisfactory for this purpose in most cases. When salted out of an aqueous dispersion at temperatures ranging from 60 to 95 degrees C., the substances are obtained in the form of a paste with a water content ranging from approximately 25 to 75%. The more hydrophilic the substance, the greater the water content, and, of course, the salt is present in the water of the paste in approximately the same concentration in which it existed in the dispersion from which the paste was salted out.

Many of the compounds of the present invention may be represented by the general formula:

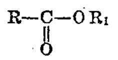

wherein

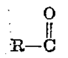

denotes the carboxylic acyl radical of a lower molecular weight aliphatic sulpho-poly-carboxylic acid and $OR_1$ denotes a radical of an alcohol amine containing a lipophile radical.

Others of the compounds of our invention may be represented by the general formula

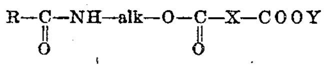

wherein

is an acyl radical containing at least six and preferably from twelve to eighteen carbon atoms, alk is alkylene or $(alkylene\text{-}O\text{-}alkylene)_t$, $t$ being one, two, three or more, X is a carbon-hydrogen residue containing a sulphonic group, and Y is a cation.

In many instances, the compounds are best and most accurately described as corresponding to reaction products of sulpho-poly-carboxylic acids with esters, amides, or mixed ester-amides of alcohol amines with higher molecular weight carboxylic, particularly fatty, acids. Most frequently, the compounds comprise mixtures.

At least many of the compounds of the present invention have utility in various arts in which interface modifying agents are employed. Many of them are resistant to precipitation by calcium and magnesium salts and are compatible with acid and alkali media. They may be utilized in washing and laundering and in the textile and related industries wherein they function for softening, wetting, detergent, emulsifying, penetrating, dispersing, frothing and foaming purposes. The textiles, various treatments of which in the presence of the agents of the present invention is rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agricultural purposes. They have utility in the preparation of cosmetic creams such as cold creams, vanishing creams, tissue creams, shaving creams of the brushless and lathering type and similar cosmetic preparations. Another use to which the agents of our invention may be placed is for the treatment of paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, as pickling inhibitors in metal cleaning baths, in shoe polishes, in rubber compositions, for breaking or demulsifying petroleum emulsions such as those of the water-in-oil type which are encountered in oil-field operations, and for various other purposes which will readily occur to those versed in the art in the light of our disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophilic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alcohol or alkyl sulphates, phosphates, pyrophosphates and tetraphosphates as, for example, lauryl sodium sulphate, myristyl sodium pyrophosphate, cetyl sodium tetra-phosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium sulpho-glutarate, lauryl monoethanolamine sulpho-acetate, and the like; sulphuric and sulphonic derivatives of condensation products of alkylolamines and higher fatty acids; Turkey-red oils; compounds of the type of isopropyl naphthalene sodium sulphonate, and other classes of wetting agents.

It will be understood that the products may be employed in the form of impure reaction mixtures containing substantial proportions of the effective interface modifying agent or agents or, if desired, for any particular purposes, purification procedures may be employed to produce pure or substantially pure products. Those versed in the art are familiar with the types of purification methods which may be employefd with advantage herein, particularly in the light of the disclosures made hereinabove.

In the event that the compounds of the invention are made by reacting the halogen derivatives with alkali sulphites or other soluble sulphites as well as thio-sulphates, the corresponding alkali sulphonic acid derivative will be produced. The term alkali is employed to include the ammonium radical ($NH_4$). When prepared by other methods so that the compounds contain the sulphonic acid group ($-SO_3H$), the hydrogen thereof may be replaced by other cations such as calcium, magnesium, aluminum, zinc, amines, alkylolamines such as mono-, di- and triethanolamine and mixtures thereof, other organic nitrogenous bases such as pyridine and piperidine, nicotine, tertiary amines, quaternary ammonium bases such as tetra-methyl ammonium hydroxide, etc., as described, for example, in the application of Benjamin R. Harris, Serial No. 190,136, filed February 11, 1938, now Patent No. 2,166,144, issued July 18, 1939. It will be understood that by the term "cation," as used throughout the specification and claims, is meant hydrogen and such other elements as are mentioned herein, and, in general, atoms or radicals which are regarded as bearing a positive charge or capable of replacing acidic hydrogen.

The sulpho-poly-carboxylic acids whose derivatives may be made in accordance with the invention herein include, by way of illustration and among others, sulphofumaric acid, sulphomaleic acid, sulphosuccinic acids, sulpho-malonic acid, sulpho-pimelic acid, sulphoglutaric acid, sulpho-azelaic acid, sulpho-citraconic acid, sulpho-mesaconic acid, sulpho-itaconic acid, sulpho-mucic acid, sulphoadipic acid, sulphosebacic acid, sulphosuberic acid, sulpho-aconitic acid, sulpho-o-carboxy cinnamic acid, and the like. The aliphatic sulphodicarboxylic acid derivatives are particularly preferred, especially those wherein the sulpho-dicarboxylic acid radical contains not more than eight carbon atoms. The sulpho-poly-carboxylic acid radicals may contain substituent groups such as halogen, amino, cyanogen, hydroxy and the like but, in general, the best results are obtained when the sulpho-poly-carboxylic acid radical is otherwise unsubstituted.

Unless otherwise indicated, the term "higher," wherever employed in the claims, will be understood to mean at least eight carbon atoms and, concomitantly, the term "lower" will means less than eight carbon atoms.

Whenever the terms sulpho-poly-carboxylic acid radical, sulpho-dicarboxylic acid radical, sulpho-succinic acid radical, or the like expression is employed in the claims, it will be understood to cover the compounds irrespective of whether the hydrogen of the sulphonic or carboxylic acid radical is present as such or replaced by another cation.

What we claim as new and desire to protect by Letters Patent of the United States is:

1. An alcohol amine in which hydroxyl hydrogen is replaced by the acyl radical of an aliphatic sulpho-poly-carboxylic acid, and in which hydrogen of the alcohol amine is replaced by an aliphatic carboxylic acyl group containing at least four carbon atoms.

2. An alcohol amine in which hydroxyl hydrogen is replaced by the acyl radical of an aliphatic sulpho-dicarboxylic acid having from four to eight carbon atoms, and in which hydrogen of the alcohol amine is replaced by a carboxylic acyl radical having from twelve to eighteen carbon atoms.

3. An alcohol amine in which hydroxyl hydrogen is replaced by a lipophile radical containing at least four carbon atoms, and in which hydroxyl hydrogen of the alcohol amine is replaced by the acyl radical of a sulpho-poly-carboxylic acid.

4. An alkylolamine in which the hydrogen of at least one hydroxy group is replaced by a carboxylic acyl radical containing from twelve to eighteen carbon atoms, and in which the hydrogen of at least one hydroxy group of the alkylolamine is replaced by the acyl radical of an aliphatic sulpho-dicarboxylic acid.

5. An alkylolamine in which the hydrogen of at least one hydroxy group is replaced by a fatty acid acyl radical containing from twelve to eighteen carbon atoms, and in which the hydrogen of at least one hydroxy group of the alkylolamine is replaced by the acyl radical of an aliphatic sulpho-dicarboxylic acid containing not more than eight carbon atoms.

6. An alkylolamine in which the hydrogen of at least one hydroxy group is replaced by the acyl radical of a mixture of higher fatty acids comprising predominately lauric acid, and in which the hydrogen of at least one hydroxy group of the alkylolamine is replaced by the acyl radical of sulpho-succinic acid.

7. An alcohol amine in which hydrogen is replaced by an aliphatic carboxylic acyl radical containing from twelve to eighteen carbon atoms, and in which the hydrogen of at least one hydroxy group of the alcohol amine is replaced by the acyl radical of an aliphatic sulpho-dicarboxylic acid.

8. An ethanolamine in which one hydroxyl hydrogen is substituted by a sulpho-succinic acid acyl radical, and in which one hydroxyl hydrogen is substituted by a straight chain aliphatic radical containing from twelve to eighteen carbon atoms.

9. An ethanolamine in which one hydroxyl hydrogen is substituted by an aliphatic sulpho-dicarboxylic acid acyl radical, and in which one hydroxyl hydrogen is substituted by a fatty acid acyl radical containing from twelve to eighteen carbon atoms.

10. An ethanolamine in which one hydroxyl hydrogen is substituted by a sulpho-poly-carboxylic acid acyl radical, and in which one hydroxyl hydrogen is substituted by a carboxylic acyl radical containing at least eight carbon atoms.

11. Triethanolamine in which the hydrogen of at least one hydroxyl group is replaced by a carboxylic acyl radical containing at least four carbon atoms, and in which the hydrogen of at least one hydroxyl group is replaced by an aliphatic sulpho-dicarboxylic acid acyl radical.

12. Triethanolamine in which the hydrogen of at least one hydroxyl group is replaced by a carboxylic acyl radical containing from twelve to eighteen carbon atoms, and in which the hydrogen of at least one hydroxyl group is replaced by an aliphatic sulpho-dicarboxylic acid acyl radical, containing not more than eight carbon atoms.

13. Triethanolamine in which the hydrogen of at least one hydroxyl group is replaced by a carboxylic acyl radical containing from twelve to eighteen carbon atoms, and in which the hydrogen of at least one hydroxyl group is replaced by a sulpho-poly-carboxylic acid acyl radical.

14. Triethanolamine in which the hydrogen of at least one hydroxyl group is replaced by an aliphatic radical containing from twelve to eighteen carbon atoms, and in which the hydrogen of at least one hydroxyl group is replaced by an aliphatic sulpho-dicarboxylic acid acyl radical.

15. Triethanolamine in which the hydrogen of at least one hydroxyl group is replaced by a lipophile radical containing at least four carbon atoms, and in which the hydrogen of at least one hydroxyl group is replaced by a sulpho-poly-carboxylic acid acyl radical.

16. A reaction product of an alkali sulphite and the product resulting from the interaction of an unsaturated aliphatic dicarboxylic acid with a fatty acid ester of an alkylolamine, the fatty acid radical containing at least four carbon atoms.

17. A process which comprises reacting an aliphatic lipophile derivative of an alcohol amine, said derivative containing at least one free hydroxy group attached to the alcohol amine nucleus, with a member selected from the group consisting of unsaturated aliphatic poly-carboxylic acids and their anhydrides, and then reacting the resulting compound with a salt of sulphurous acid.

18. The process which comprises reacting a member of the group consisting of maleic acid, maleic acid anhydride, and fumaric acid, with an alcohol amine aliphatic derivative containing at least eight carbon atoms, said derivative containing at least one hydroxy group attached to the alcohol amine nucleus, and then reacting the resulting compound with a bisulphite.

19. A process which comprises reacting a higher aliphatic acid ester of an alcohol amine, said ester containing at least one free hydroxy group attached to the alcohol amine nucleus, with a member selected from the group consisting of unsaturated poly-carboxylic acids and their anhydrides, and then reacting the resulting compound with an alkali bisulphite.

20. An alcohol amine in which hydroxyl hydrogen is replaced by the acyl radical of an aliphatic sulpho-dicarboxylic acid, and in which hydrogen of a member of the class consisting of hydroxy and amine groups is replaced by an aliphatic carboxylic acyl group containing at least twelve carbon atoms.

ALBERT K. EPSTEIN.
MORRIS KATZMAN.